United States Patent Office 2,963,516
Patented Dec. 6, 1960

2,963,516

DIHALOCYCLOPROPYL OLEFINS

James M. Shackelford and Louis H. Schwartzman, Pittsburgh, Pa., assignors to Koppers Company, Inc., a corporation of Delaware No Drawing. Filed Feb. 16, 1959, Ser. No. 793,281

6 Claims. (Cl. 260—648)

This invention relates to certain novel dihalocyclopropyl olefins and to a method for their preparation. In one specific aspect, it relates to the novel reaction products of a haloform with 1,3,5-hexatriene.

In recent years considerable emphasis has been placed on the development of polymeric materials which are self-extinguishing or flame-retardant. The wide spread interest in the use of plastics, especially plastic foams, as insulation materials in building construction, has created a considerable need for fire-resistant or flame-retardant polymers. The Fire Underwriters Laboratories has deemed the highly flammable polymeric materials unsuitable for construction purposes, since the use of such materials would exacerbate the ever-present fire hazards in buildings and in homes. Certain flame-retardant polystyrene foams have been developed to provide a suitable polymeric material for construction purposes. While such materials are satisfactory from the standpoint of flame retardance, their heat resistance is somewhat limited by the melting point of the polystyrene.

Quite surprisingly, we have discovered certain novel monomeric materials, viz: mono-dihalocyclopropyl olefins (i.e. dihalocyclopropyl butadiene), which can be copolymerized with styrene to provide high melting, flame-retardant copolymers of improved heat resistance. Such copolymers can be made into foams by the method described in the copending application of G. F. D'Alelio, S.N. 394,230, filed November 24, 1953.

In addition, the method of the invention provides novel bis-dihalocyclopropyl olefins, which, although they are not monomers, have interesting chemical properties. Both the mono- and bis-dihalocyclopropyl olefins of the invention are effective insecticides. Since these novel compounds are readily soluble in common organic solvents, they are conveniently sprayed on the object to be treated as e.g. a 5-25% by weight solution in xylene. The compounds are effective in killing or inhibiting crop pests, fungi and nematodes.

It is, therefore, an object of the present invention to provide novel monomeric mono-dihalocyclopropyl olefins which are useful in the preparation of flame-retardant polymeric materials. It is a further object to provide a new class of compounds having insecticidal and nematocidal properties. It is a still further object to provide a method of making novel dihalocyclopropyl olefins.

The novel dihalocyclopropyl olefins of the invention are the reaction products of a haloform and 1,3,5-hexatriene. The products are the mono-dihalocyclopropyl olefins of the formula:

I. 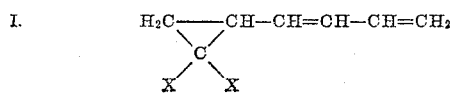

wherein X is a member selected from the group consisting of chlorine, bromine and iodine and the bis-dihalocyclopropyl olefins of the formula:

II. 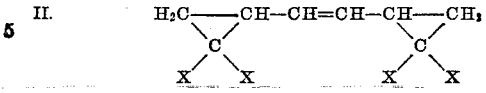

wherein X is a member of the group consisting of chlorine, bromine and iodine. The reaction can be controlled, in a manner described hereafter, to produce predominant quantities of either the compounds of Formula I or Formula II shown hereabove.

In accordance with the process of the invention, 1,3,5-hexatriene is contacted with a haloform selected from the group consisting of chloroform, bromoform and iodoform in the presence of an alkali metal alkoxide. The dihalocyclopropyl olefin is separated from the reaction mixture using conventional techniques and is easily purified by distillation.

Alkali metal lower alkoxides are used to initiate the reaction. The alkoxide reacts with the haloform to form an intermediate (believed to be a carbene) which, in turn, combines with the 1,3,5-hexatriene to form the dihalocyclopropyl olefin.

Useful alkoxides include, but are not limited to, the potassium, sodium and lithium methoxides, ethoxides, isopropoxides, tertiary butoxides, tertiary amylalkoxides, and the like. The use of secondary or tertiary lower alkoxides is preferred, since they tend to promote a higher yield of the desired product.

The amount of alkali metal lower alkoxide present in the reaction mixture depends upon the amount of haloform used. Generally speaking, about 1 mole of alkoxide should be used for each mole of haloform present, although excess haloform can be used, if desired, but no particular advantage is derived thereby.

The reaction temperature is not particularly critical. If the temperature used is too high, there is some danger of decomposition of the intermediate reactant and, if this occurs, only low yields result. We prefer to use a temperature ranging from about $-25$ to $+40°$ C. The reaction works well at atmospheric pressure, although higher or lower pressures can be used, if desired.

The particular dihalocyclopropyl olefin obtained by the method of the invention depends to some extent upon the mole ratio of haloform to 1,3,5-hexatriene. The mono-dihalocyclopropyl olefins are produced as the principal product by having present in the reaction mixture from about 1-2 moles of haloform for each mole of 1,3,5-hexatriene. If it is desired to produce a predominance of bis-dihalocyclopropyl olefin, there should be present in the reaction mixture from about 2-5 moles of haloform for each mole of hexatriene.

The order of addition of the primary reactants is not critical. The haloform may be added to a mixture of alkali metal lower alkoxide and 1,3,5-hexatriene or, alternatively, the alkoxide may be added to a mixture of haloform and 1,3,5-hexatriene. Since the haloform and lower alkoxide react to form an intermediate which in turn results in the formation of the dihalocyclopropyl olefin, it is desirable to avoid contact between these two materials before the 1,3,5-hexatriene is placed in the reaction mixture. The alkali metal lower alkoxide may be added directly to the reaction mixture or it may be dissolved in a suitable non-participating solvent and then added thereto. We have found that it is convenient to add the alkoxide in alcoholic solution, using lower alcohols such as ethyl alcohol, tertiary butyl alcohol, and the like. Using an alcoholic solution, the alkali metal alkoxide can be added stepwise to a mixture of haloform and 1,3,5-hexatriene as the reaction progresses.

The reaction mixture is kept under mild agitation for a sufficient time to allow the reaction to go to completion. Generally speaking, the reaction is completed after a period of about 4-8 hours.

The product dihalocyclopropyl olefin is recovered from the reaction mixture using conventional laboratory techniques. A convenient method involves adding, after the reaction is complete, a hydrocarbon solvent such as pentane, hexane, and the like thereto. The water-soluble impurities are removed by extraction with water and the product remains behind in the organic solution. The organic solution is thereafter filtered, dried and distilled to give pure dihalocyclopropyl olefin as a final product.

The mono-dihalocyclopropyl olefins of the invention can be heat-polymerized or polymerized with an organic peroxide initiator, e.g. benzoyl peroxide, lauroyl peroxide, tertiary butyl peroxide, and the like, to give a high melting, flame-retardant polymer. Excellent flame-retardant materials are also produced by the suspension copolymerization of about 5–25% by weight of mono-dihalocyclopropyl olefin and 95–75% by weight styrene. The resulting copolymer beads can be made into foams by the method described in the copending application of D'Alelio, supra. The mono-dihalocyclopropyl olefins can also be copolymerized with other monomers such as butadiene, isoprene, alkyl and halo-substituted styrenes, and the like to provide useful plastics which are flame-retardant, heat-resistant, and of high impact strength.

Our invention is further illustrated by the following examples:

EXAMPLE I

Into a 1-liter, 3-neck, round-bottom flask, equipped with a mechanical stirrer and dropping funnel were placed 1,3,5-hexatriene (16 g., 0.2 m.) and bromoform (0.2 m.). The mixture was externally cooled and maintained at 0° and a solution of potassium tert-butoxide in tert-butanol (0.25 m. in 250 ml.) was added thereto over a period of six hours. The resulting reaction mixture was stirred one hour at 0° and one hour at room temperature. It was then added to 200 ml. of pentane. The solution was washed with water (3×500 ml.), dried, concentrated and distilled through a Vigreaux column to yield 42 g. (83%) of 1-(2,2-dibromocyclopropyl) - 1,3 - butadiene boiling at 58–62°/1 mm.; $n_D^{23}$ 1.5755.

EXAMPLE II

Into a 3-liter, 3-necked, round-bottom flask, equipped with a mechanical stirrer and dropping funnel were placed 1,3,5-hexatriene (69 g., 0.86 m.) and chloroform (206 g., 1.73 m.). The mixture was externally cooled and maintained at 0° and a solution of potassium tert-butoxide in tert-butanol (1.75 m. in 1600 ml.) was added thereto over 8 hours. The resulting reaction mixture was stirred at room temperature overnight and then added to hexane (1 liter). The solution was extracted with water (500 ml. portions) until the aqueous extract was neutral. The organic solution was dried over magnesium sulfate, filtered and distilled.

*Distillation of product*

| Cut No. | Temp. (°C.) | Wt. (g.) |
| --- | --- | --- |
| I | <50°/5mm | 4.5 |
| II | 50–55°/5mm | 69.0 |
| III | 90–110°/5mm | 24.5 |

Cut II was redistilled to yield 67 g. (41%) of 1-(2,2-dichlorocyclopropyl)-1,3-butadiene, B.P. 86–88°/33 mm., $n_D^{25}$ 1.5207.

Cut III was redistilled, B.P. 90–95°/33 mm., $n_D^{25}$ 1.5319 and then dissolved in petroleum ether (30–60°). The solution was cooled in Dry Ice and the precipitate was filtered. This was repeated five times to yield a white, solid product M.P. 54.5–55.0°, bis-1,2-(2,2-dichlorocyclopropyl)-ethene.

We claim:

1. A dihalocyclopropyl olefin having the formula:

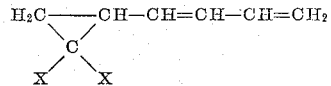

wherein X is a member selected from the group consisting of chlorine, bromine and iodine.

2. An olefin of claim 1 wherein X is chlorine.
3. An olefin of claim 1 wherein X is bromine.
4. A dihalocyclopropyl olefin having the formula:

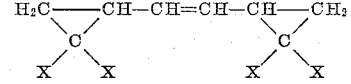

wherein X is a member selected from the group consisting of chlorine, bromine and iodine.

5. An olefin of claim 4 wherein X is chlorine.
6. An olefin of claim 4 wherein X is bromine.

References Cited in the file of this patent

Doering et al.: J. Am. Chem. Soc., 76, 6162–5 (1954).
Doering et al.: J. Am. Chem. Soc. 78, 5447–8 (1956).